US012394312B2

(12) United States Patent
Draayer et al.

(10) Patent No.: US 12,394,312 B2
(45) Date of Patent: Aug. 19, 2025

(54) SYSTEMS AND METHODS FOR FACILITATING MATERIALS-HANDLING VEHICLE OPERATIONAL COMPLIANCE

(71) Applicant: Hyster-Yale Materials Handling, Inc., Fairview, OR (US)

(72) Inventors: Nicholas M. Draayer, Portland, OR (US); Ryan P. McDermott, Fairview, OR (US)

(73) Assignee: Hyster-Yale Materials Handling, Inc., Fairview, OR (US)

( * ) Notice: Subject to any disclaimer, the term of this patent is extended or adjusted under 35 U.S.C. 154(b) by 0 days.

(21) Appl. No.: 17/464,467

(22) Filed: Sep. 1, 2021

(65) Prior Publication Data

US 2022/0068131 A1 Mar. 3, 2022

Related U.S. Application Data

(60) Provisional application No. 63/073,680, filed on Sep. 2, 2020.

(51) Int. Cl.
*G08G 1/0967* (2006.01)
*B60W 30/14* (2006.01)

(52) U.S. Cl.
CPC ..... *G08G 1/096766* (2013.01); *B60W 30/143* (2013.01); *B60W 2555/60* (2020.02); *B60W 2556/45* (2020.02)

(58) Field of Classification Search
CPC .......... G08G 1/096766; B60W 30/143; B60W 2555/60; B60W 2556/45; G05D 1/028; G05D 2201/0216
See application file for complete search history.

(56) References Cited

U.S. PATENT DOCUMENTS

| 5,258,911 A | 11/1993 | Wellman et al. |
| 2007/0187496 A1* | 8/2007 | Andersen ............. G06Q 10/087 235/385 |
| 2019/0092570 A1 | 3/2019 | MacDonald et al. |
| 2020/0250502 A1* | 8/2020 | Manci .................... G05D 1/021 |

OTHER PUBLICATIONS

European Search Report, EPO Patent Appl. No. 21194292.5-1202 (Feb. 2, 2022).

* cited by examiner

*Primary Examiner* — Aniss Chad
*Assistant Examiner* — Nikki Marie M Molina
(74) *Attorney, Agent, or Firm* — Laurence & Phillips IP Law

(57) ABSTRACT

Real-time location systems and beacons are used to facilitate operating a materials-handling vehicle in compliance with rules of the road. Materials-handling vehicles may include a processor operably coupled to at least one vehicle system and a receiver communicatively coupled with the processor and configured to receive signals from a real-time location system and from one or more beacons that are located at known positions in an environment in which the vehicle operates. The vehicle is programmed to receive a signal from the real-time location system in response to entering a zone in the environment, communicate with a beacon associated with the zone, determine a position of the vehicle in the zone, and to perform at least one of modifying an operating characteristic of the vehicle system and operating the vehicle system based on the determined position of the vehicle and a rule of the road.

33 Claims, 8 Drawing Sheets

SYSTEMS AND METHODS FOR FACILITATING MATERIALS-HANDLING VEHICLE OPERATIONAL COMPLIANCE

CROSS REFERENCE TO RELATED APPLICATION

This application claims priority to U.S. Provisional Patent Application No. 63/073,680, entitled "Systems and Methods for Facilitating Compliance with Rules of the Road," filed Sep. 2, 2020. The entire disclosure of that patent application is incorporated by reference herein.

TECHNICAL FIELD

The field of this disclosure relates to enhancing materials-handling vehicle compliance with rules of the road. More specifically, this disclosure relates to systems and methods for materials-handling vehicles using a real-time location system and a beacon location system to enhance rules of the road compliance during vehicle operation.

BACKGROUND INFORMATION

The background description provided herein is for the purpose of generally presenting the context of the disclosure. Unless otherwise indicated herein, the materials described in this section are not prior art to the claims in this application and are not admitted to be prior art by inclusion in this section.

Vehicles operate in diverse environments, and each environment may have its own operation limitations, or rules of the road, that govern how vehicles should be operated in the environment. However, human vehicle operators may not be cognizant of all of the rules of the road for a particular environment, or may fail to follow rules of the road for an environment for diverse reasons.

OVERVIEW OF DISCLOSURE

Vehicles, including materials-handling vehicles, may be operated in environments that benefit from having operation limitations, referred to herein as "rules of the road," which may be designed to optimize system efficiency and performance. For example, a warehouse having an inventory picking and transport system is an environment in which a system for operating materials-handling vehicles that follow one or more rules of the road may be advantageous. In such environments, it is desirable that all vehicles follow the rules of the road designated for that environment. Compliance with one or more rules of the road may be improved and operator training can be enforced using the systems and methods described herein.

One aspect of this disclosure relates to a materials-handling vehicle for enhancing rules of the road compliance including a processor associated with the materials-handling vehicle and operably coupled to at least one vehicle system; and a receiver communicating with the processor, wherein the receiver is configured to receive signals from a real-time location system and from one or more beacons that are located at known positions in an environment in which the vehicle operates; wherein the materials-handling vehicle is programmed to receive a signal from a real-time location system in response to entering a zone in the environment monitored by the real-time location system; wherein the materials-handling vehicle is further programmed to communicate with one or more beacons associated with the zone in response to receiving the signal from the real-time location system; wherein the materials-handling vehicle is further programmed to determine a position of the vehicle in the zone based on the known positions of the one or more beacons associated with the zone; and wherein the materials-handling vehicle is further programmed to perform at least one of (i) modifying an operating characteristic of the vehicle system and (ii) operating the vehicle system based on (a) the determined position of the vehicle with respect to one or more beacons associated with the zone and (b) a rule of the road.

An additional aspect of this disclosure relates to a method for operating a materials-handling vehicle to comply with a rule of the road, the method including, via a processor/receiver combination, receiving information indicating that the materials-handling vehicle has entered a zone in an environment in response to the vehicle entering the zone; via the processor/receiver combination, communicating with one or more beacons associated with the zone in response to receiving information indicating that the vehicle has entered the zone; via the processor/receiver combination, determining the vehicle's position in the zone in response to communicating with one or more beacons associated with the zone; via the processor/receiver combination, determining a rule of the road based on the vehicle's position in the zone; and via the processor/receiver combination, performing at least one of (i) modifying an operating characteristic of the vehicle system and (ii) operating the vehicle system based on (a) the determined position of the vehicle in the zone and (b) the rule of the road.

One will appreciate, however, that methods for operating a vehicle, including a materials-handling vehicle, to comply with one or more rules of the road using other advantageous steps described herein are also possible.

In an embodiment, a system for enhancing rules of the road compliance includes a real-time location system that monitors zones in an environment; one or more beacons that are located at known positions in the environment, wherein one or more beacons are associated with one or more zones monitored by the real-time location system; a materials-handling vehicle; a processor associated with the materials-handling vehicle and operably coupled to at least one vehicle system; a receiver communicating with the processor, wherein the receiver is configured to receive signals from the real-time location system and from the one or more beacons; wherein the combination of the receiver and processor is programmed to receive a signal from the real-time location system in response to entering a zone in the environment monitored by the real-time location system; wherein the combination of the receiver and processor is further programmed to communicate with one or more beacons associated with the zone in response to receiving the signal from the real-time location system; wherein the combination of the receiver and processor is further programmed to determine a position of the vehicle in the zone based on the known positions of the one or more beacons associated with the zone; and wherein the combination of the receiver and processor is further programmed to perform at least one of (i) modifying an operating characteristic of the vehicle system and (ii) operating the vehicle system based on (a) the determined position of the vehicle with respect to the one or more beacons associated with the zone and (b) a rule of the road.

In some additional, alternative, or selectively cumulative embodiments, the rule of the road is associated with a zone in the environment.

In some additional, alternative, or selectively cumulative embodiments, the zone in the environment designates an aisle.

In some additional, alternative, or selectively cumulative embodiments, the rule of the road includes a vehicle speed limit associated with a portion of an aisle.

In some additional, alternative, or selectively cumulative embodiments, the zone designates an aisle and the rule of the road includes a vehicle speed limit associated with a portion of the aisle.

In some additional, alternative, or selectively cumulative embodiments, the vehicle speed limit is associated with an exit end portion of an aisle.

In some additional, alternative, or selectively cumulative embodiments, one or more of the beacons associated with the zone is located in an aisle.

In some additional, alternative, or selectively cumulative embodiments, one or more of the beacons associated with the zone is located outside an aisle.

In some additional, alternative, or selectively cumulative embodiments, the rule of the road is associated with the zone and the rule of the road is specific to a type of materials-handling vehicle.

In some additional, alternative, or selectively cumulative embodiments, performing at least one of (i) modifying an operating characteristic of the vehicle system and (ii) operating the vehicle system includes modifying the operating characteristic of the vehicle system and operating the vehicle system.

In some additional, alternative, or selectively cumulative embodiments, the zone in the environment includes an aisle, the rule of the road includes a speed limit for a portion of the aisle; and modifying an operating characteristic of the vehicle system includes reducing a maximum speed for the vehicle.

In some additional, alternative, or selectively cumulative embodiments, the zone in the environment includes an aisle, the rule of the road includes a speed limit for a portion of the aisle; and operating the vehicle system includes reducing a speed of the vehicle.

In some additional, alternative, or selectively cumulative embodiments, the zone in the environment includes an aisle, the rule of the road includes a speed limit for a portion of the aisle; modifying an operating characteristic of the vehicle system includes reducing a maximum speed for the vehicle; and operating the vehicle system includes reducing a speed of the vehicle.

Additional aspects and advantages will be apparent from the following detailed description of example embodiments, which proceeds with reference to the accompanying drawings.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
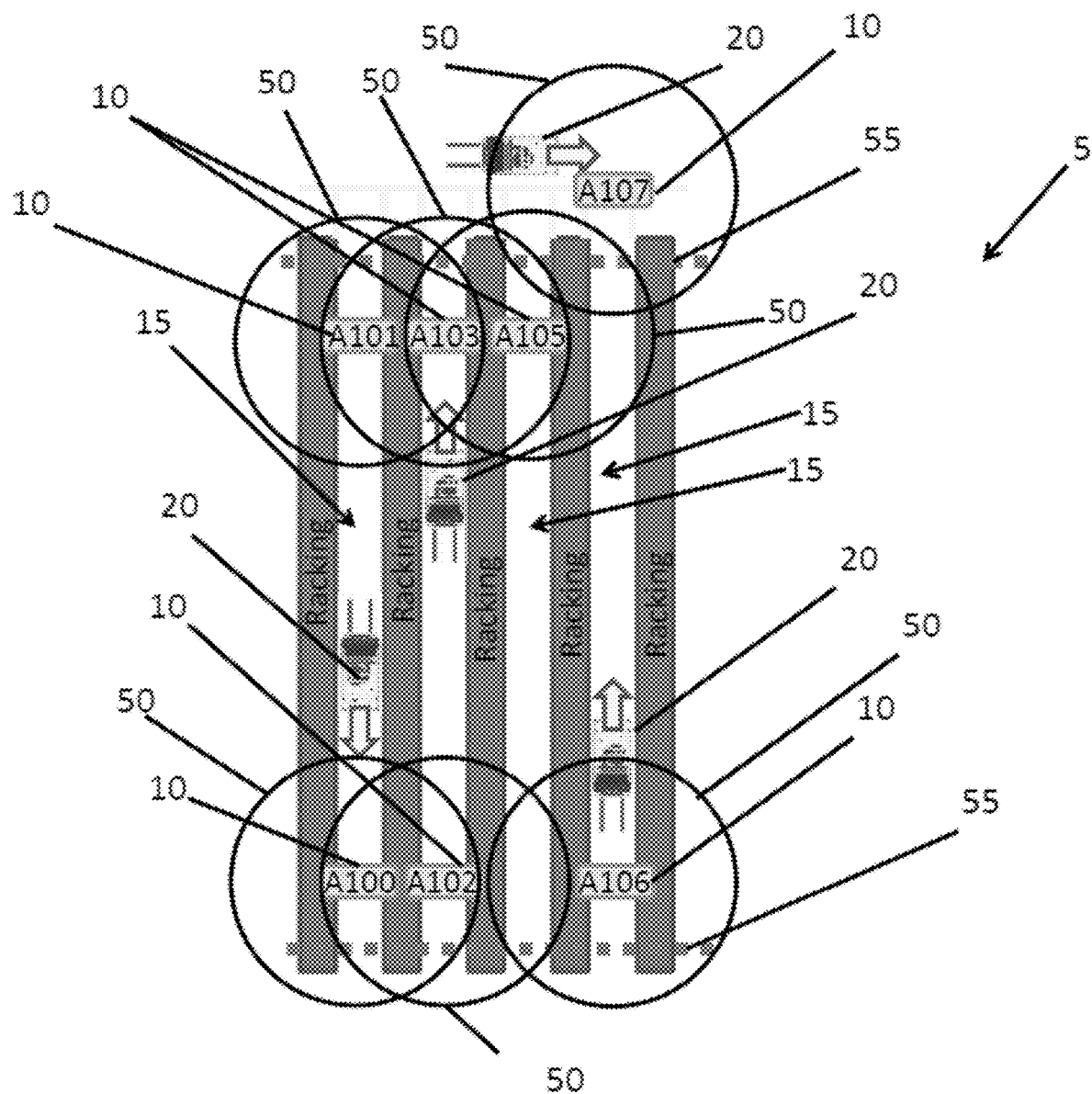
FIG. 1 illustrates an exemplary environment including only beacons.

Exemplary embodiments are described below with reference to the above-listed drawings. The terminology used herein is for the purpose of describing particular example embodiments only and is not intended to be limiting. As used herein, the singular forms "a," "an" and "the" are intended to include the plural forms as well, unless the context clearly indicates otherwise. It should be recognized that the terms "comprise," "comprises," "comprising," "include," "includes," "including," "has," "have," and "having," when used in this document, specify the presence of stated features, integers, steps, operations, elements, and/or components, but do not preclude the presence or addition of one or more other features, integers, steps, operations, elements, components, and/or groups thereof.

Unless otherwise expressly stated, the sizes, positions, etc., of components, features, elements, etc., as well as any distances therebetween, are not necessarily to scale, and may be disproportionate and/or exaggerated for clarity. Unless indicated otherwise, the terms "about," "thereabout," "substantially," "approximately," etc. mean that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. In certain embodiments, the terms "about," "substantially," and "approximately," refer to values that are, for example, within 1% of the stated value, within 2% of the stated value, within 3% of the stated value, within 4% of the stated value, within 5% of the stated value, within 6% of the stated value, within 7% of the stated value, within 8% of the stated value, within 9% of the stated value, within 10% of the stated value, within 11% of the stated value, within 12% of the stated value, within 13% of the stated value, within 14% of the stated value, or within 15% of the stated value. In an embodiment, the terms "about," "substantially," and "approximately," refer to values that are within 10% of the stated value.

Unless otherwise specified, a range of values, when recited, includes both the upper and lower limits of the range, as well as any sub-ranges therebetween. Unless indicated otherwise, terms such as "first," "second," etc., are only used to distinguish one element from another and not to imply any relative order, placement, or ranking. For example, one element could be termed a "first element" and similarly, another element could be termed a "second element," or vice versa. The section headings used herein are for organizational purposes only and are not to be construed as limiting the subject matter described.

Spatially relative terms, such as "right," left," "below," "beneath," "lower," "above," and "upper," and the like, may be used herein for ease of description to describe one element's or feature's relationship to another element or feature, as illustrated in the drawings. It should be recognized that the spatially relative terms are intended to encompass different orientations in addition to the orientation depicted in the drawings. For example, if an object in the figures is turned over, elements described as "below" or "beneath" other elements or features would then be oriented "above" the other elements or features. Thus, the term "below" can, for example, encompass both an orientation of above and below. An object may be otherwise oriented (e.g., rotated 90 degrees or at other orientations) and the spatially relative descriptors used herein may be interpreted accordingly.

Unless clearly indicated otherwise, all connections and all operative connections may be direct or indirect. Similarly, unless clearly indicated otherwise, all connections and all operative connections may be rigid or non-rigid. For the purposes of the present disclosure, the phrase "A and/or B" means (A), (B), or (A and B). For the purposes of the present disclosure, the phrase "combination of (A) and (B)" means (A), (B), or (A and B). For the purposes of the present disclosure, the phrase "A, B, and/or C" means (A), (B), (C), (A and B), (A and C), (B and C), or (A, B and C).

Because like numbers refer to like elements throughout, the same or similar numbers may be described with reference to other drawings even if they are neither mentioned nor described in the corresponding drawing. Also, even elements that are not denoted by reference numbers may be described with reference to other drawings. Additionally, the drawings may include non-essential elements that are included only for the sake of thoroughness.

It is to be understood that other embodiments may be utilized and structural or logical changes may be made without departing from the scope of the present disclosure. Therefore, the detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

The description may use the phrases "in an embodiment," or "in embodiments," which may each refer to one or more of the same or different embodiments. Unless indicated otherwise, elements or operations of one embodiment may be used with other embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

In certain situations it may be desirable to modify characteristics of a vehicle, including a materials-handling vehicle, such as maximum speed, current speed, available power from a motor or engine, acceleration/deceleration rates, or other suitable characteristic. For example, modifying a vehicle's characteristics may alert an operator to a change in the vehicle's environment, may facilitate operating the vehicle in accordance with rules of the road associated with particular portions of an environment, may do both, or may be done for other suitable purposes.

As one skilled in the art will appreciate in light of this disclosure, certain embodiments of the systems and methods of enhancing vehicle compliance for the vehicles that are disclosed herein may be capable of achieving certain advantages, including, in some cases, one or more of the following: (1) facilitating electronic communication between vehicles in environments containing multiple metal racks and/or shelving units within a large area; (2) increasing the likelihood of vehicles exiting and/or entering a vehicle travel lane within an environment at a low speed; (3) enforcing vehicle operator training within an environment; (4) reducing or eliminating the use of ground-based location transmitters in an environment by moving communication to transmitters not located on the ground; (5) improving efficiency of vehicle movement within a multivehicle environment; (6) increasing operator decision-making time within a multivehicle environment; and (7) affording the ability to quickly and completely introduce, alter, and/or remove one or more rules of the road throughout the entirety of an environment. The foregoing and other advantages of various embodiments will be apparent upon reading this document.

The systems and methods disclosed herein may enforce compliance of rules of the road by various types of vehicles operating in various types of environments. For example, the materials-handling vehicle may be operating in one or more of a specific type of environment such as a warehouse, a stockyard, a shipyard, a cold room, and a storage room, including indoor and outdoor environments. Additionally, the type of materials-handling vehicle may vary, and may include one or more of a lift truck, tugger, order picker, big truck, or any combination of the foregoing vehicles. In certain embodiments of the systems and methods disclosed herein, the materials-handling vehicle is operating in a warehouse.

FIG. 1 illustrates an example environment 5 where beacons 10 are located at predetermined positions, such as proximate to the end of aisles 15. Beacons 10 may be considered to be at the beginning of an aisle 15 or the end of an aisle 15 depending primarily on the direction that a vehicle 20 travels through an aisle 15. For example, beacon A101 is considered to be a beginning of aisle beacon 10 and beacon A100 is considered to be an end of aisle beacon 10 because the vehicle 20 traveling through the aisle 15 associated with beacons A101 and A100 entered the aisle 15 proximate beacon A101 and traverses the aisle 15 towards beacon A100. However, if the vehicle 20 traveling through the aisle 15 associated with beacons A101 and A100 entered the aisle 15 proximate beacon A100 and traverses the aisle 15 towards beacon A101 then beacon A100 is considered to be the beginning of aisle beacon 10 and beacon A101 is considered the end of aisle beacon 10. Beacons 10 may be located inside an aisle, such as beacon A101 or outside of an aisle, such as beacon A107.

Figure 2:
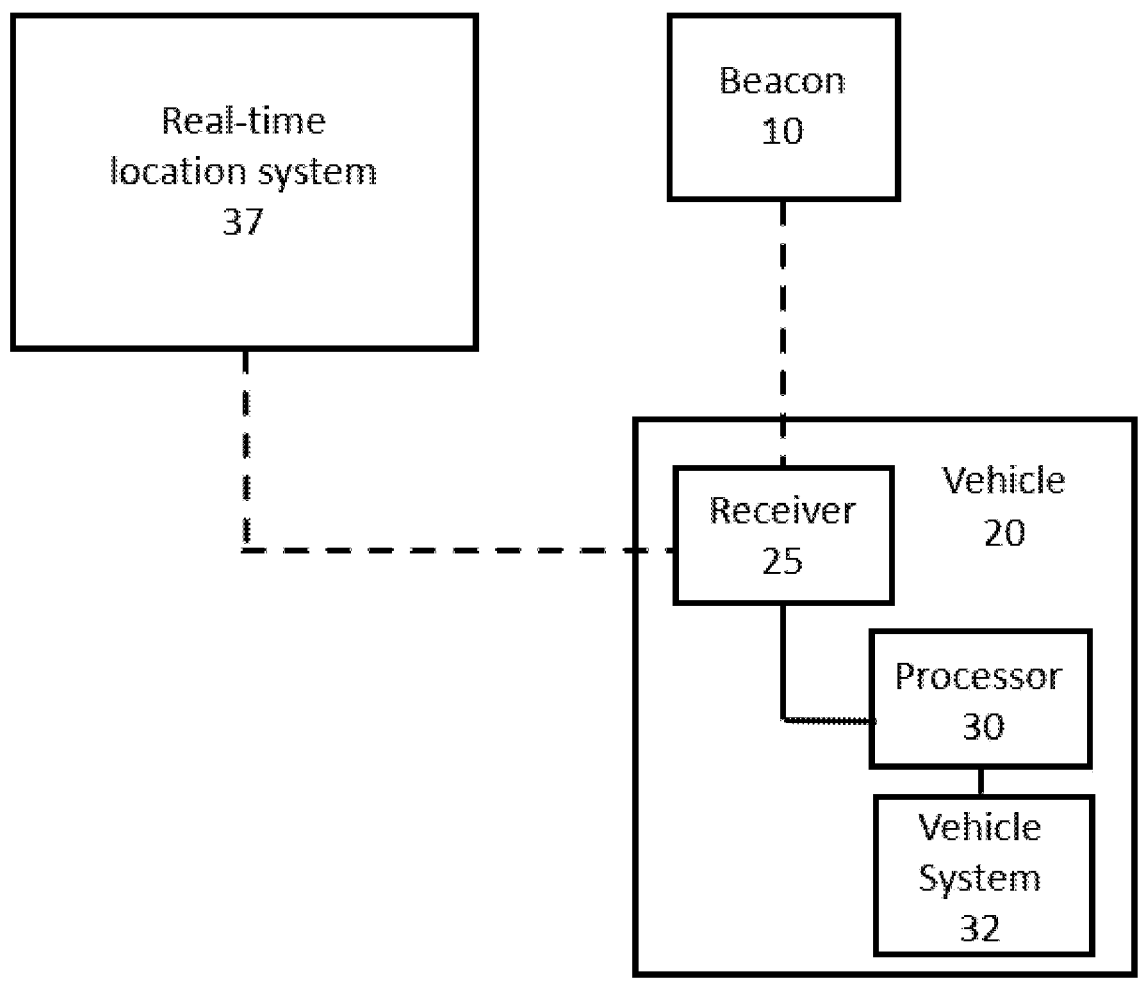
FIG. 2 is a block diagram of a vehicle system that is configured to communicate with beacons and a real-time location system, according to an embodiment.

Beacons 10 are designed and constructed to emit signals, such as ultra-wide band, radio-frequency identification, or other suitable signals, and such signals may propagate from beacons 10 in a spherical pattern. The term "anchor" is an alternate term for a beacon as both terms generally refer to technologies that operate in similar manners. The signals are received by a receiver 25 (FIG. 2) on a vehicle 20, where the receiver 25 communicates with a processor 30 that is operatively connected to one or more vehicle systems 32, such as, but not limited to, a drive system, a carriage height system, a brake system, a mast tilt system, or other suitable systems. The processor 30 may modify a vehicle system, and thus a vehicle characteristic, in response to receiving a signal from a beacon 10, for example, by reducing a maximum vehicle speed, altering the vehicle's current speed, or taking other suitable actions. The receiver 25, processor 30, or both, may also determine a distance between the vehicle 20 and a beacon 10, or make other suitable determinations. Beacons 10 may emit signals a predetermined distance, for example, based on the power of the beacons 10 or a setting that limits the signal strength.

If solely beacons 10 are used to alert a vehicle 20 when it approaches the end of an aisle 15, vehicles may be limited to the rules of the road that may be followed. For example, a rule of the road may be to slow a vehicle's maximum speed to a predetermined amount, such as 1 kilometer per hour, one meter before the end of an aisle 15 to increase the likelihood that a vehicle operator does not exit the aisle 15 without stopping at the end of the aisle 15. If only beacons 10 communicate with processor 30, such a rule may be difficult to implement. For example, if the signals only propagate one meter from each beacon 10, a vehicle traveling at maximum speed in an aisle 15 may not be able to stop before exiting an aisle 15 because the slowdown/stopping distance may be insufficient. On the other hand, if the signals propagate more than one meter from each beacon 10, a processor 30 on a vehicle 20 may cause a vehicle 20 to slow down too early, that is, more than one meter from the end 55 of an aisle 15. Or, regardless of the distance signals propagate from beacons 10, a processor 30 of a vehicle 20 may cause the vehicle 20 to slow down at the beginning of an aisle, even though the rules of the road do not require a slowdown at the beginning of an aisle, because the processor 30 may not be able to differentiate between entering an aisle 15 and exiting an aisle 15. Or, as is the case of vehicle 20 proximate beacon A107, a processor 30 may cause a vehicle 20 to slow down even when the vehicle 20 is not in an aisle 15. Even if sensors 25 and/or processors 30 are configured to determine the distance from beacons 10, for a vehicle 20 such as vehicle 20 approaching beacon A103, it may be difficult for the sensor 25 and/or processor 30 to determine where the vehicle 20 is in relation to individual beacons. For example, there may be positions at which the vehicle 20 is equidistant from multiple beacons 10, such as beacons A101, A103, and A105, which makes determining which aisle 15 the vehicle 20 is in difficult. Such difficulties complicate following a rule of the road such as slowing a vehicle's maximum speed to a predetermined amount, such as 1 kilometer per hour, one meter before the end of an aisle 15.

Figure 3:
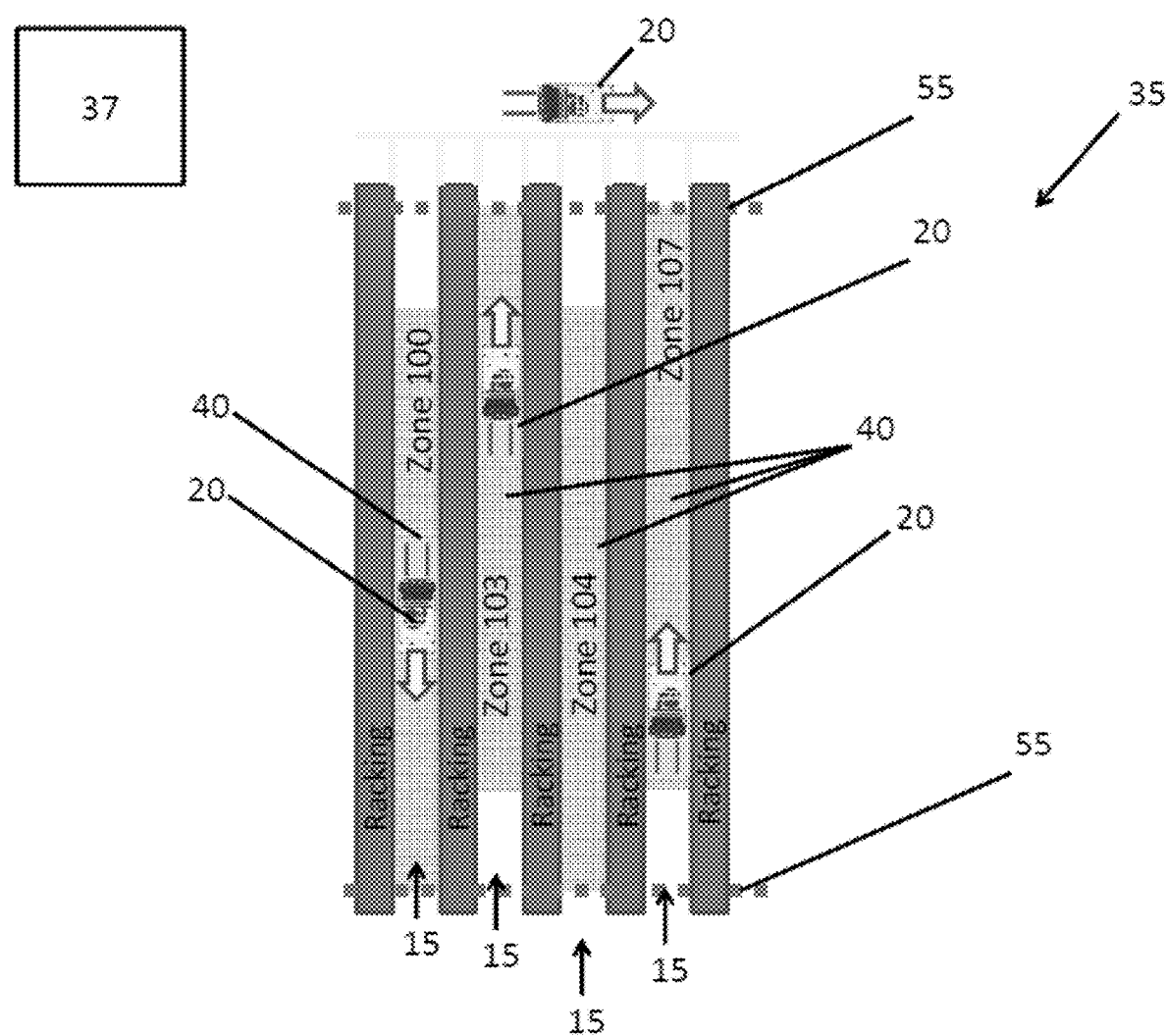
FIG. 3 illustrates an exemplary environment including only zones monitored by a real-time location system.

FIG. 3 illustrates another example environment 35 where a real-time location system 37 may be used to establish zones 40 in the environment 35. An example real-time location system comprises the Real Time Location Services (RTLS) and the Indoor Tracking RFID Systems offered by Litum Technologies, of Pasaport-Konak Izmir, Turkey. Litum's RTLS location trackers operate on an ultra-wide band (UWB) RFID frequency to provide location accuracy. The signals from each one of Litum's RTLS RFID tags, which may be attached to staff, assets, and/or vehicles, are processed by Litum's mesh network that consists of anchors (readers) and gateways. The information is processed by Litum's RTLS software, where zone control and alert management functions are managed. The real-time location system 37 does not operate instantaneously; rather, the location information generated by the real-time location system is subject to delays and latencies, including those attributable to transmission and processing, but is nonetheless considered "real-time" as used herein.

The real-time location system 37 is preferably a wide-area location system, operable throughout all, substantially all, or most of the environment 35 in which vehicles 20 operate and/or in which the rules of the road are applicable. The real-time location system 37 typically covers an area that includes multiple zones 40, and the range of the real-time location system is greater than that of the beacons within the environment 35.

Such real-time location system 37 may also communicate with processors 30 of vehicles 20 to inform the processors 30 whether vehicles 20 are inside or outside of zones 40, and if in a zone 40, where within the zone 40 a vehicle 20 is located. For example, an optional second receiver 25A may be included on vehicle 20 and communicating with processor 30, or receiver 25 may be configured to receive signals from beacons 10 and from a real-time location system 37. Such real-time location system 37 may use ultra-wideband, radio frequency, infrared, ultrasound, or other suitable technology with tags associated with vehicles 20 and/or fixed reference points to determine the locations of vehicles 20 in the environment 35. However, there is typically a lag time associated with such real-time location system 37 so the instantaneous location of a vehicle 20 is typically not precisely known unless the vehicle 20 is not moving. Because of such lag time, using only a real-time location system 37 to implement rules of the road, such as slowing a vehicle's maximum speed to a predetermined amount, such as 1 kilometer per hour, one meter before the end of an aisle 15, may be difficult. For example, by the time a real-time location system 37 determines that a vehicle 20 is one meter from the end of an aisle 15 the vehicle 20 will most likely have already exited the aisle 15. Thus, a slowdown to 1 kilometer per hour one meter before the end of the aisle 15 may not be possible to carry out by the processor 30 of such a vehicle 20.

Figure 4:
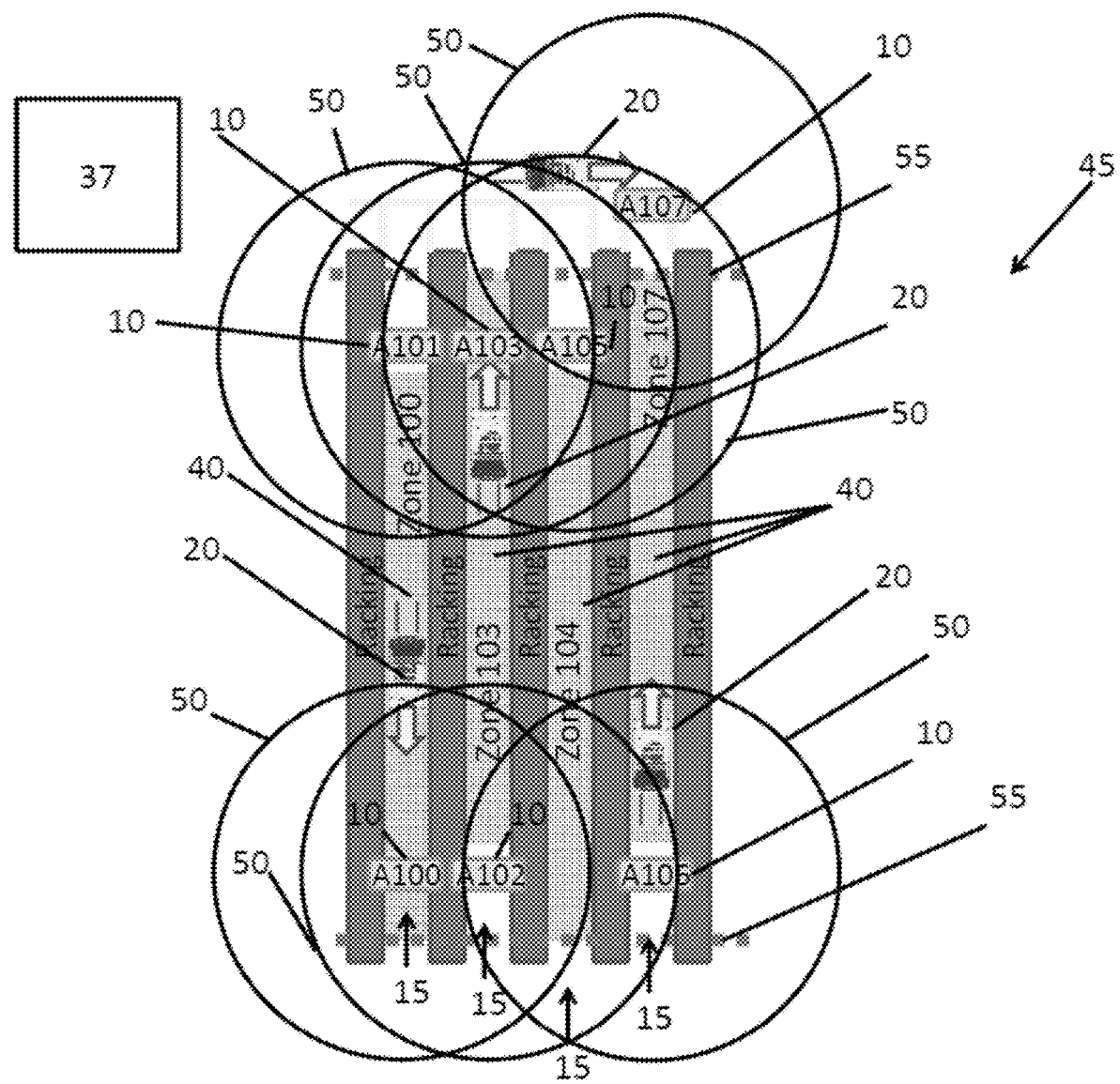
FIG. 4 illustrates an exemplary environment that includes both a real-time location system to establish zones, and beacons.

FIG. 4 illustrates an example environment 45 that includes both a real-time location system 37 to establish zones 40, and beacons 10. Because processors 30 of vehicles 20 may be informed within which zone 40 a vehicle 20 may be located, each processor 30 may be instructed to communicate with a specific beacon 10 to take advantage of the faster response time of the beacons 10 and the ability of the receivers 25 and/or processors 30 to determine a distance of vehicles 20 from individual beacons 10. The combination of a real-time location system 37 and its zones 40 with beacons 10 may thus enable complex rules of the road to be implemented by processors 30.

Figure 5:
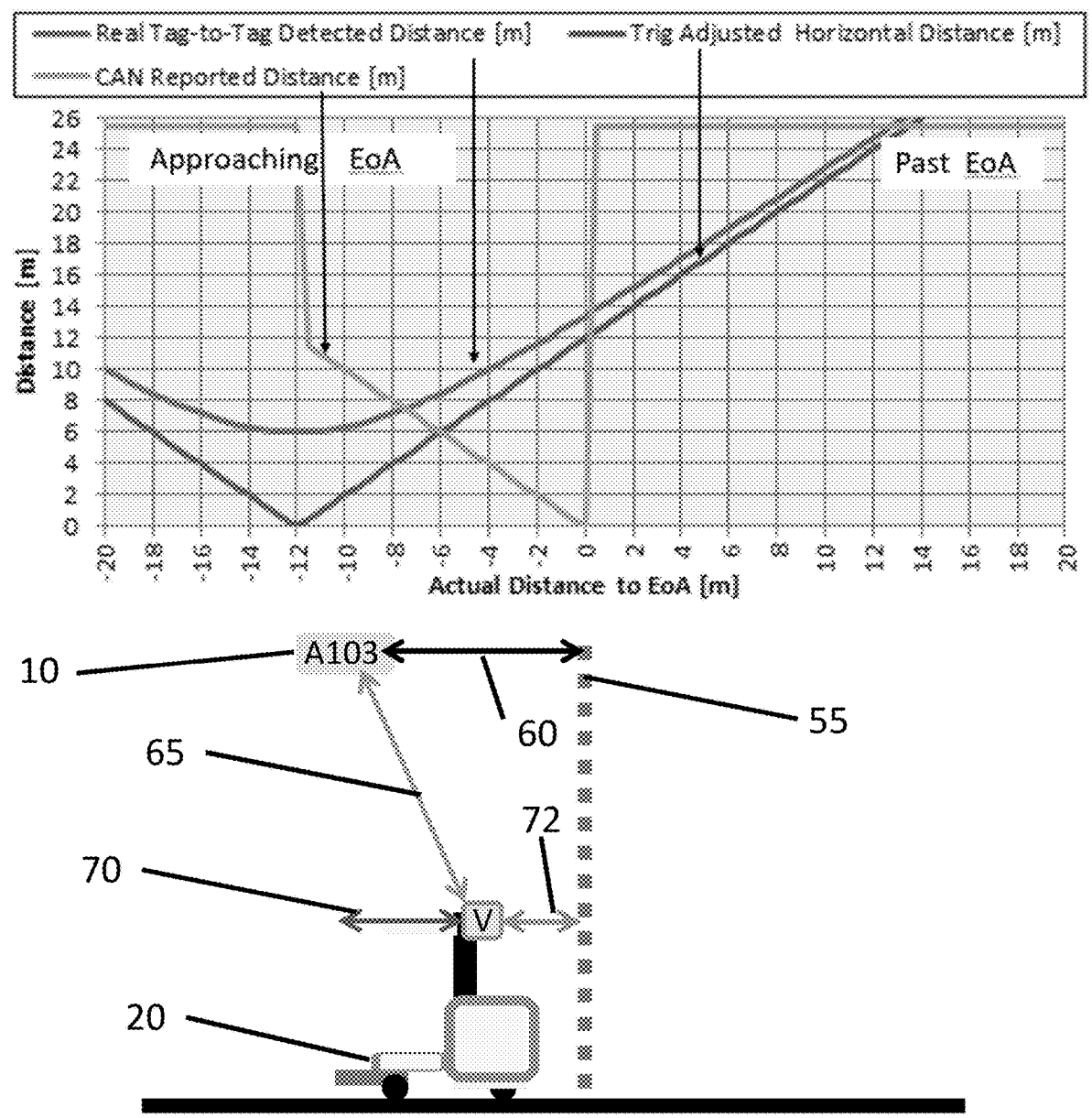
FIG. 5 illustrates an exemplary distance determination to an end of aisle.

For example, with reference to FIGS. 4 and 5, a real-time location system 37 in communication with the processor 30 of vehicle 20 in Zone 103, for example, via receiver 25, may inform the processor 30 that vehicle 20 is in Zone 103. In response to determining that the vehicle 20 is in Zone 103, the processor 30 may communicate, or attempt to communicate, with one or both of beacons A103 and A102, but ignores signals from other beacons 10. For example, the real-time location system 37 may be programmed to know where each beacon 10 is within environment 45 and may inform processors 30 which beacons 10 a processor 30 should be communicating with based on the location of a vehicle 20 associated with a processor 30. Alternately, beacons 10 may emit unique identifiers and processors 30 may know which beacons 10 are associated with which zones 40 such that a processor 30 determines which beacons 10 to communicate with in response to determining in which zone the vehicle 20 associated with the processor 30 is located. Each beacon 10 in an environment 45 may store its own, known location within the environment 45, or the location of each beacon 10 may be stored in the real-time location system 37 or in vehicle processors 30.

Note that FIG. 4 illustrates signals propagating from beacons in a spherical pattern represented by signal circles 50. In FIG. 4, signal circles 50 do not extend over the entirety of each aisle 15, however signal circles 50 may be configured with a greater radius such that they extend over the entirety of each aisle 15, or signal circles 50 may be configured with a lesser radius depending on user configurations and needs. Additionally, each signal circle 50 in FIG. 4 is illustrated as being the same size, however signal circles 50 may have different sizes for different beacons 10, for example, depending on the location of a beacon 10 and the area for which it should provide signal coverage.

The location of each beacon 10 with respect to the end of each aisle 15, indicated by dashed lines 55, is known and may be programmed into each beacon 10. Specifically, the horizontal distance 60 that a beacon 10 is located from the end of aisle 55 may be programmed and stored in beacon 10. Alternately, the horizontal distance 60, or other suitable parameters, that a beacon 10 is located from the end of aisle 55 may be programmed and stored in processors 30, a real-time location system 37, or other suitable circuitry.

Rules of the road are whatever rules are established for vehicles in an environment by persons using vehicles in the environment. In one example, an aisle, such as aisle 15 associated with Zone 103 in FIG. 4, may have rules of the road that designate the aisle 15 as a one-way aisle 15 with a beginning proximate beacon A102 and an end proximate beacon A103. The rules of the road may also stipulate that a vehicle 20 entering the beginning of the aisle 15 has no need for speed limiting, that a maximum speed of 1 kilometer per hour applies when the vehicle 20 is within 1 meter of the end of aisle 55, and that no speed limit is imposed after passing the end of aisle 55. In other examples, the rules of the road may be designated to meet the operational needs of a particular environment for one or more different types of vehicles operating in that environment. In other words, one environment may be associated with different rules of the road that govern the characteristics of different vehicle types operating in that environment. For example, one rule of the road may be specific to a tugger while another rule of the road may be specific to an order picker. Alternately, different rules of the road may apply for the same environment depending on different times of day, days of the week, seasons, etc. Rules of the road are flexible and may be determined by vehicle operators, owners, or other suitable persons.

When a vehicle 20 enters Zone 103, information from a real-time location system 37 is used by the processor 30 to determine that the vehicle 20 is in Zone 103. Typically, timing delays, known as a lag time, associated with information transmitted between a real-time location system 37 and a processor 30 associated with a moving vehicle 20, results in the vehicle 20 already being in the Zone 103 before the processor is able to determine that the vehicle 20 is in the Zone 103. However, in this example, no speed limit is associated with entering the beginning of an aisle 15 so there is no need to inform the processor 30 that it is at the beginning of the aisle 15. Once processor 30 determines that the vehicle 20 is in Zone 103, the processor 30 may communicate only with beacon A103 and ignore signals from other beacons 10. In other examples, the processor 30 may communicate with beacons A103 and A102 and ignore signals from other beacons.

While in Zone 103, the receiver 25 on vehicle 20 determines a straight-line distance 65 (FIG. 5) between the vehicle 20 and beacon A103. Because the position of beacon A103 is known, including the fact that beacon A103 is located within the aisle 15, receiver 25 also determines a horizontal distance 70 between the vehicle 20 and the beacon A103. Alternately, information from receiver 25 may be provided to processor 30 which may make the distance determinations.

In this example, beacon A103 is located 12 meters from the end of aisle 55, which is a sufficient distance for vehicle 20 to slow from its maximum speed to 1 kilometer per hour, one meter before reaching end of aisle 55. Therefore, receiver 25 may be programmed to report a predetermined distance, such as 25.5 meters, to processor 30 while the vehicle 20 is approaching beacon A103. Upon reaching beacon A103, for example, when vehicle 20 is underneath beacon A103, receiver 25 may be programmed to report the distance 72 that vehicle 20 is from the end of aisle 55. In response, processor 30 may be programmed to decelerate vehicle 20, for example by limiting the maximum speed, reducing motor or engine torque, applying the brakes, or other suitable action performed via vehicle system actuators communicating with and/or controlled by processor 30 as needed to facilitate bringing vehicle 20 to a maximum speed of 1 kilometer per hour, one meter before reaching the end of aisle 55. After passing the end of aisle 55, the combination of receiver 25 and processor 30 may permit the vehicle 20 to travel at its maximum speed, if commanded to do so. For example, receiver 25 may again report the predetermined distance of 25.5 meters that processor 30 uses as an indication to impose no speed limit on vehicle 20.

Optionally, the receiver 25 and/or processor 30 may determine if the vehicle 20 enters an aisle 15 at the end of the aisle instead of at the beginning, for example, entering aisle 15 proximate beacon A103. In such a case, the processor 30 may be programmed to decelerate or stop vehicle 20, for example by limiting the maximum speed, reducing motor or engine torque, applying the brakes, or other suitable action performed via vehicle system actuators communicating with and/or controlled by processor 30 as needed to inhibit vehicle 20 from proceeding the wrong way down an aisle 15.

In another example, with reference to FIG. 4, a vehicle 20, such as the vehicle 20 proximate beacon A107, may determine via information received from a real-time location system 37 that the vehicle 20 is not in any zone, and may therefore ignore signals from beacons 10.

Figure 6:
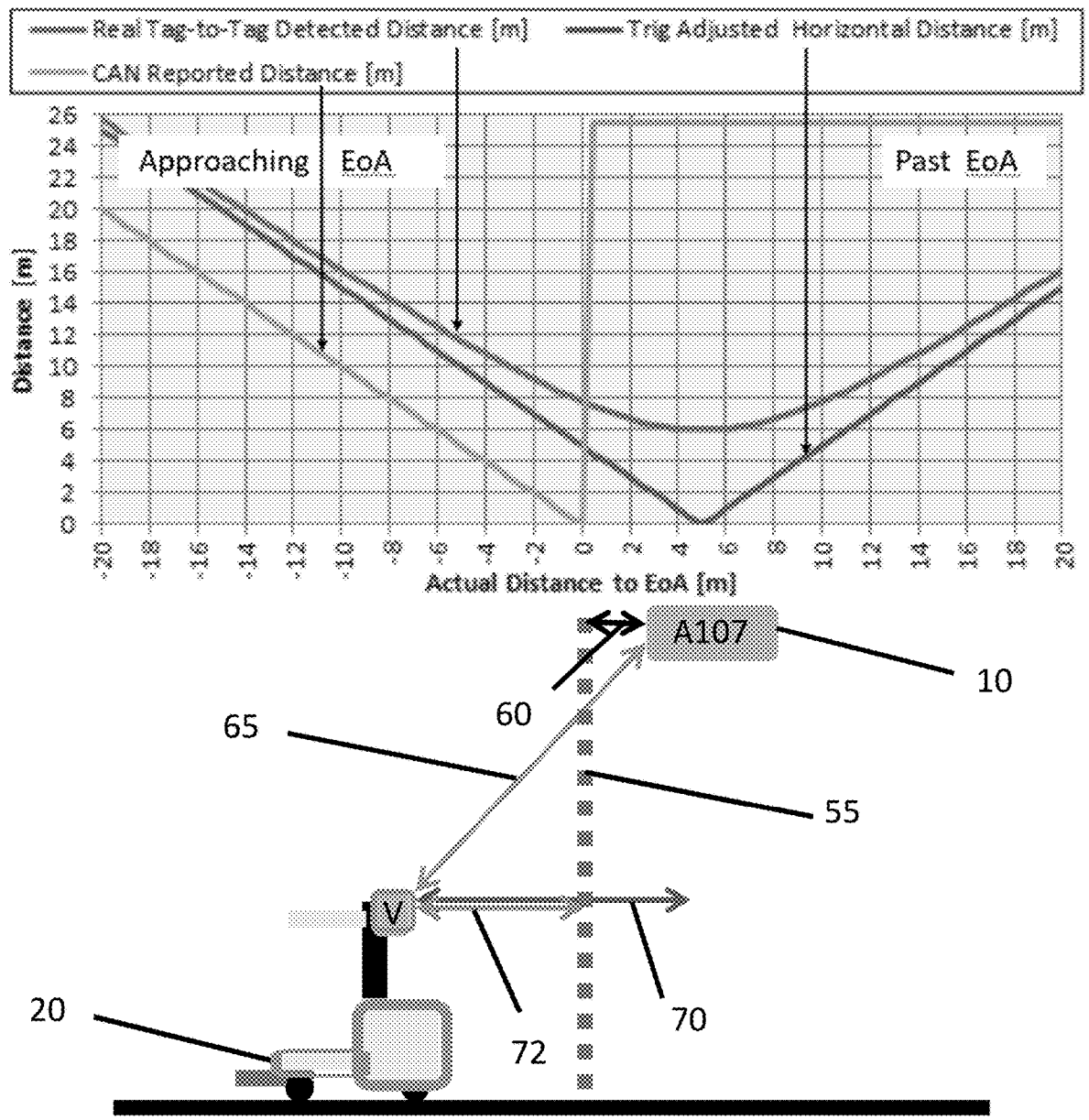
FIG. 6 illustrates another exemplary distance determination to an end of aisle.

In another example, with reference to FIGS. 4 and 6, beacon A107 is located five meters outside of the end of aisle 55. While in Zone 107, the receiver 25 on vehicle 20 determines a straight-line distance 65 between the vehicle 20 and beacon A107. Because the position of beacon A107 is known, including the fact that beacon A107 is located outside of the aisle 15, receiver 25 also determines a horizontal distance 70 between the vehicle 20 and the beacon A107. Because the horizontal distance beacon A107 from the end of aisle 55 is known, receiver 25 may readily determine the distance 72 vehicle 20 is from the end of aisle 55. Alternately, information from receiver 25 may be provided to processor 30 which may make the distance determinations.

Unlike when a beacon is located in an aisle 15, when a beacon 10 is located outside of an aisle 15, receiver 25 may be programmed to report the actual distance 72 vehicle 20 is from end of aisle 55 to processor 30 while the vehicle 20 is in Zone 107. In response, processor 30 may be programmed to decelerate vehicle 20, for example by limiting the maximum speed, reducing motor or engine torque, applying the brakes, or other suitable action performed via vehicle system actuators communicating with and/or controlled by processor 30 as needed to facilitate brining vehicle 20 to a maximum speed of 1 kilometer per hour, one meter before reaching the end of aisle 55. After passing the end of aisle 55, the combination of receiver 25 and processor 30 may permit the vehicle 20 to travel at its maximum speed, if commanded to do so. For example, receiver 25 may report a predetermined distance of 25.5 meters that processor 30 uses as an indication to impose no speed limit on vehicle 20. Other suitable mechanisms may be used to permit a vehicle 20 to travel at its maximum speed once the vehicle 20 has moved beyond an end of aisle 55. In alternate embodiments, the receiver 25, processor 30, or both may report the distance 72 a vehicle 20 is from an end of aisle 55 for a situation when a beacon 10 is located inside an aisle 15.

Figure 7:
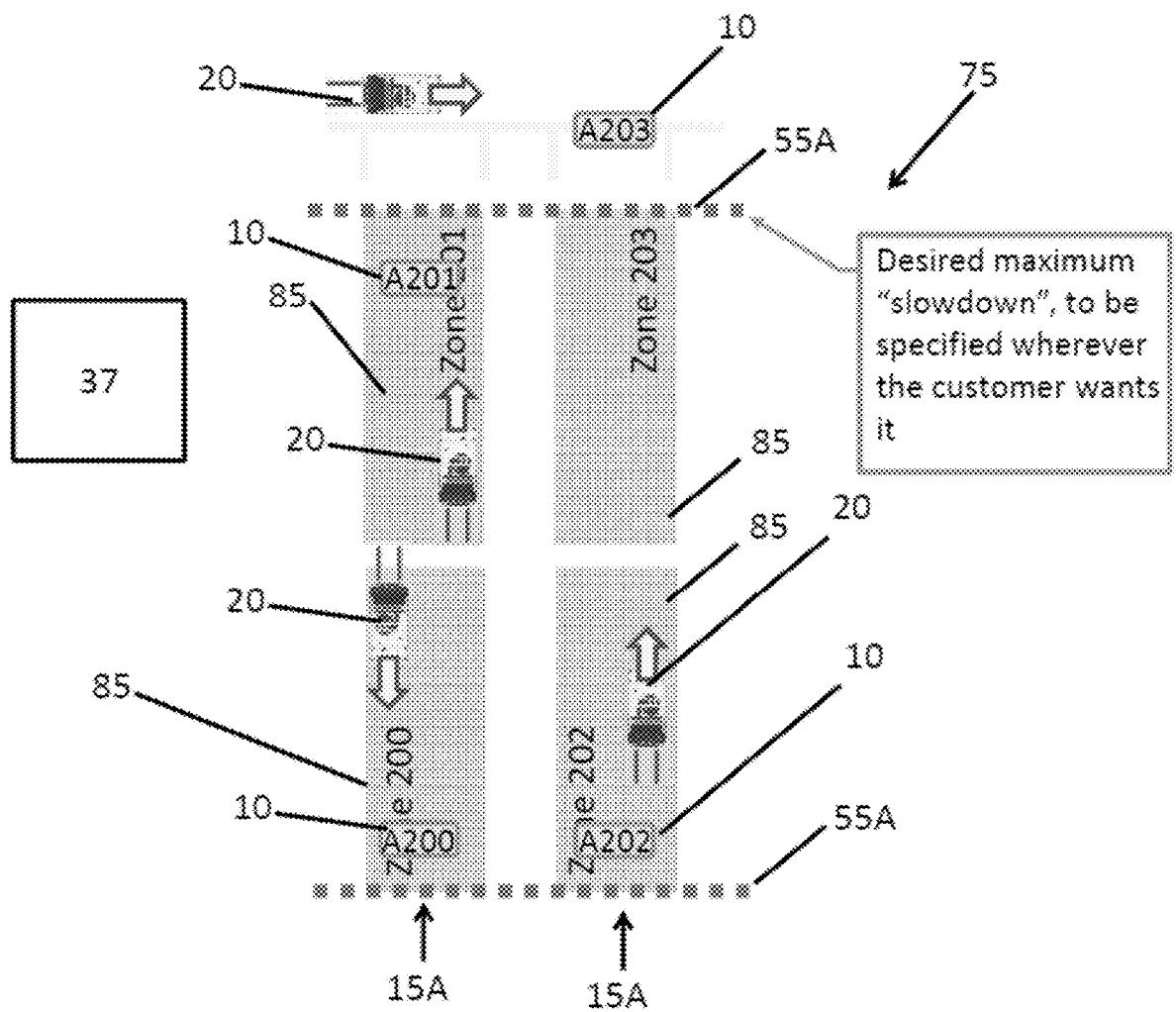
FIG. 7 illustrates an exemplary environment that includes both a real-time location system to establish zones, and beacons.

In another example, with reference to FIG. 7, an environment 75 may include aisles 15A that are configured for two-way traffic. When entering zones 85, vehicles 20 may determine distances to beacons 10 or end of aisle 55A as described above. Or, vehicles 20 may make other suitable determinations for the environment 75.

One manner vehicles 20 may determine which of beacons 10 to communicate with upon entering one of the zones 85 may be to start a timer, and when the timer elapses determine which of the beacons 10 is closest and communicate with the closest beacon. Or, a vehicle 20 may initiate communication with both beacons associated with an aisle 15A upon entering one of the zones 85 and track which one of the beacons 10 the vehicle 20 is moving toward and which one of the beacons 10 the vehicle 20 is moving away from, then, optionally, drop communication with the beacon 10 that the vehicle 20 is moving away from. Other suitable manners may be used to determine which beacon 10 a vehicle 20 should communicate with upon entering zone 85.

In another example, a system for enhancing rules of the road compliance comprises a vehicle 20 equipped with a processor 30. The processor 30 is operably coupled to at least one vehicle system such as a drive system, braking system, or other suitable system. The vehicle 20 is also equipped with a receiver 25 communicating with the processor 30. The receiver 25 is configured to receive signals from a real-time location system 37 and from one or more beacons 10 that are located at known positions in an environment 45 in which the vehicle 20 operates. Optionally, the receiver 25 includes separate receiving components, one tuned for signals from beacons 10 and one tuned for signals from real-time location system 37. Other suitable arrangements for receiving signals from both beacons 10 and real-time location system 37 may be used, including, but not limited to, using two separate receivers, and are intended to be covered by the language "a receiver."

The system is programmed to receive a signal from the real-time location system 37 in response to entering a zone 40 in the environment 45 monitored by the real-time location system 37. For example, the receiver 25 may be configured to receive signals from the real-time location system 37 and transmit such signals to the processor 30, or may transmit information to the processor 30 based on receipt of such signals from the real-time location system 37. The system is further programmed to communicate with one or more beacons 10 associated with the zone 40 that the vehicle 20 entered in response to receiving the signal from the real-time location system 37. For example, the receiver 25 may further be configured to receive signals from beacons 10.

The system is also programmed to determine a position of the vehicle 20 in the zone 40 based on the known positions of the one or more beacons 10 associated with the zone 40. For example, the receiver 25 may determine the position of the vehicle 20 with respect to a beacon 10 using time of flight or other suitable distance determination technique and extrapolate the position of the vehicle 20 based on the known position of the beacon 10 and the fact that the vehicle 20 is in the zone 40. Or, information may be passed from the receiver 25 to the processor 30 and the processor 30 may make such determinations.

The system is also programmed to perform at least one of (i) modifying an operating characteristic of the vehicle system and (ii) operating the vehicle system based on (a) the determined position of the vehicle with respect to one or more beacons associated with the zone and (b) a rule of the road. For example, the processor 30 may be operatively coupled to, or be part of, a vehicle controller that sets a maximum allowable speed for the vehicle 20. In response to determining that a vehicle 20 is in a part of a zone that designates an aisle 15 and that a rule of the road specifies a speed limit of 1 kilometer per hour for an upcoming part of the aisle 15, the processor 30 may set a lower maximum vehicle speed such that the vehicle 20 slows down as it approaches the portion of the aisle with the 1 kilometer per hour speed limit. In another example, the processor 30 may be operatively coupled to an actuator that controls the amount of throttle for a motor or engine. In response to determining that a vehicle 20 is in a part of a zone that designates an aisle 15 and that a rule of the road specifies a speed limit of 1 kilometer per hour for an upcoming part of the aisle 15, the processor 30 may reduce the amount of throttle commanded for the vehicle 20 such that the vehicle 20 slows down as it approaches the portion of the aisle with the 1 kilometer per hour speed limit. Other suitable modifications of vehicle characteristics or operations of vehicle systems may be used, for example, to satisfy vehicle operational conditions and/or limits and applicable rules of the road.

In other examples, the system may include the real-time location system 37 and/or the beacons 10.

Figure 8:
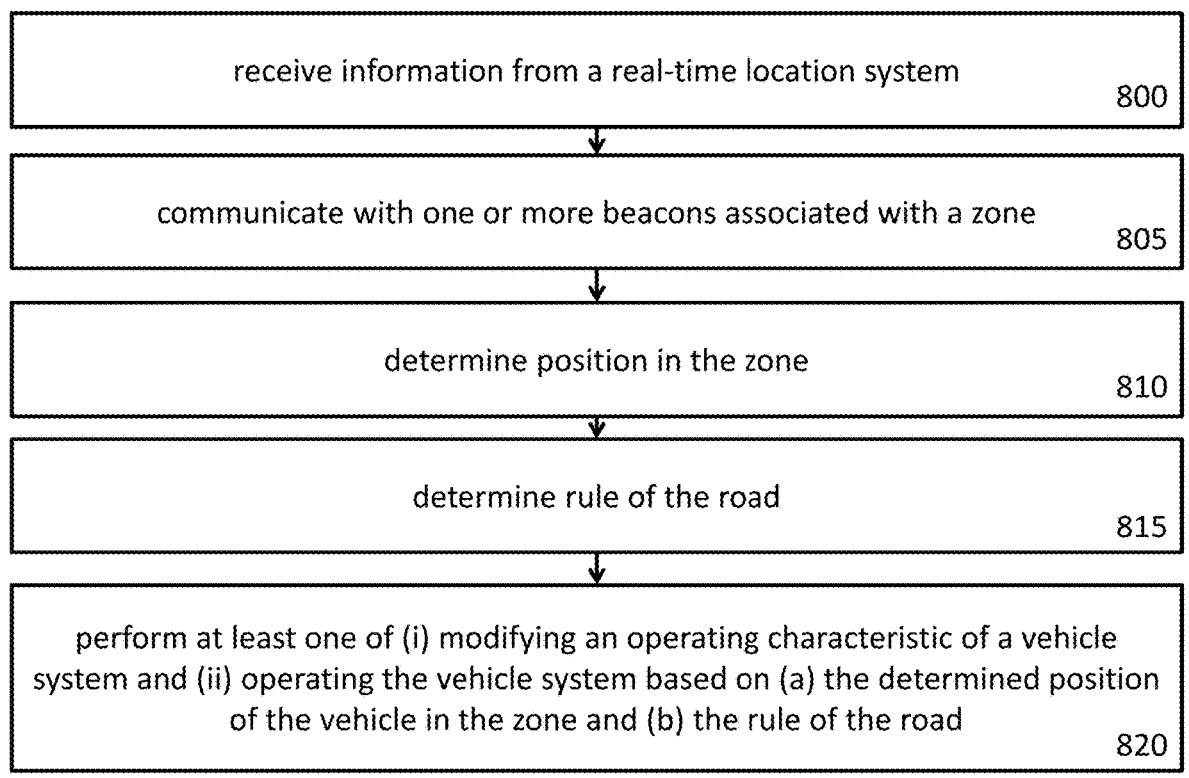
FIG. 8 illustrates an exemplary method for operating a vehicle, such as a materials-handling vehicle, to facilitate compliance with a rule of the road.

With reference to FIG. 8, an example method for operating a vehicle to facilitate compliance with a rule of the road is described. At operation 800 a receiver 25, processor 30, or both, receive information from a real-time location system 37 indicating that the vehicle 20 has entered a specific zone 40 in an environment 45 in response to the vehicle entering the specific zone 40. The processor 30/receiver 25 combination communicates with one or more beacons 10 associated with the specific zone 40 in response to receiving information indicating that the vehicle 20 has entered the zone 40 at operation 805. Then, at operation 810 the processor 30/receiver 25 combination determines the vehicle's 20 position in the zone 40 in response to communicating with one or more beacons 10 associated with the zone 40. At operation 815 the processor 30/receiver 25 combination determines a rule of the road based on the vehicle's 20 position in the zone 40. For example, the processor 30 may be associated with a memory that contains rules of the road for various zones 40, or one or more rules of the road applicable to the specific zone 40 may be communicated to the processor 30/receiver 25 combination via the real-time location system 37. Other suitable arrangements may be used to determine one or more rules of the road.

At operation 820 the processor 30/receiver 25 combination performs at least one of (i) modifying an operating characteristic of a vehicle system and (ii) operating the vehicle system based on (a) the determined position of the vehicle 20 in the zone 40 and (b) the rule of the road.

In an additional example, a system for facilitating vehicle operational compliance including the real-time location system 37 and/or the beacons 10 may be updated via the processor 30 associated with a memory containing rules of the road for various zones 40, such as by adding, changing, or removing instructions for one or more rules of the road applicable to the specific zone 40. The updated instructions may be communicated to the processor 30/receiver 25 combination via the real-time location system 37. The changes in the rules of the road may therefore be very efficiently communicated, in a global manner, to all vehicles 20 throughout an environment via the system. Additionally, the systems may be set up to encompass, for example, both inside and outside environments.

The systems and methods for facilitating vehicle operational compliance described herein can be readily adapted to environments having structures or components that can potentially interfere with certain types of vehicle communications, such as tall and/or largely metallic or magnetic storage racks or shelving units, refrigerated inventory storage areas, or areas having sound dampening features. The use of beacons 10 that are installed in a location that is not on the ground or road surface, such as those installed on or from walls and/or the ceiling, additionally removes potential hazards resulting from use of beacons in or near vehicle traffic lanes or parking areas while still allowing for vehicle communication.

One will appreciate that aspects of the systems and methods for facilitating vehicle operational compliance as depicted for the forklift trucks described herein can also be utilized for other vehicles including other materials-handling vehicles, for example, towing tugs, end-rider trucks, and order pickers, which are operating in one or more environments, including a warehouse, a stockyard, a shipyard, a cold room, and a storage room. The systems and methods may include one or more types of materials-handling vehicles operating in multiple environments. In an embodiment, the materials-handling vehicles are operating in a warehouse.

Conclusion

It will be apparent to those skilled in the art that various modifications and variations can be made in the disclosed embodiments of the disclosed device and associated methods without departing from the spirit or scope of the disclosure. For example, filtering out non-pedestrian devices and classifying more than one device as an operator device may be performed for any or all of the above-described embodiments. Those with skill in the art will readily appreciate that embodiments may be implemented in a wide variety of ways. Thus, it is intended that the present disclosure covers the modifications and variations of the embodiments disclosed above provided that the modifications and variations come within the scope of any claims and their equivalents.

The invention claimed is:

1. A materials-handling vehicle for use in an environment and for use with a real-time location system that is configured to track locations of materials-handling vehicles within the environment, wherein the environment comprises multiple zones established by the real-time location system, and wherein the environment comprises multiple beacons having respective fixed locations in the environment and permanently associated with the multiple zones respectively, the vehicle comprising:
   a processor in the materials-handling vehicle and operably coupled to a vehicle system; and
   one or more receivers, in or on the materials-handling vehicle and communicatively coupled with the processor, configured to receive signals from the real-time location system and from the beacons;
   wherein the materials-handling vehicle is configured to receive a signal from the real-time location system in response to entering a particular zone in the environment, wherein the signal identifies one or more chosen beacon with which the materials-handling vehicle should communicate;
   wherein the materials-handling vehicle is further configured to communicate, in response to receiving the signal from the real-time location system, with one or more of said at least one of the one or more chosen beacons;
   wherein the materials-handling vehicle is further configured to determine, in response to communicating with one or more of said at least one of the one or more chosen beacons, an applicable rule of the road; and
   wherein the materials-handling vehicle is further configured to perform at least one of (i) modifying an operating characteristic of the vehicle system and (ii) operating the vehicle system based on the applicable rule of the road.

2. A materials-handling vehicle according to claim 1, wherein the applicable rule of the road is associated with the particular zone.

3. A materials-handling vehicle according to claim 1, wherein the particular zone designates an aisle.

4. A materials-handling vehicle according to claim 3, wherein the applicable rule of the road comprises a vehicle speed limit associated with a portion of the aisle.

5. A materials-handling vehicle according to claim 4, wherein the vehicle speed limit is associated with an exit end portion of the aisle.

6. A materials-handling vehicle according to claim 4, wherein one or more of said at least one of the one or more chosen beacons is located in the aisle.

7. A materials-handling vehicle according to claim 4, wherein one or more of said at least one of the one or more chosen beacons associated with the particular zone is located outside the aisle.

8. A materials-handling vehicle according to claim 1, wherein the applicable rule of the road is associated with the particular zone and the applicable rule of the road is specific to a type of materials-handling vehicle.

9. A materials-handling vehicle according to claim 1, wherein performing at least one of (i) modifying an operating characteristic of the vehicle system and (ii) operating the vehicle system comprises modifying the operating characteristic of the vehicle system and operating the vehicle system.

10. A method for operating a materials-handling vehicle to comply with a rule of the road in an environment, wherein a real-time location system is configured to track locations of materials-handling vehicles within the environment, wherein the environment comprises multiple zones established by the real-time location system, wherein each of the multiple zones established via the real-time location system has one or more associated beacons, each beacon having a fixed location and being permanently associated with one of the multiple zones, the method comprising at least the following steps performed at the materials-handling vehicle:
  entering a particular zone, which is a particular one of the multiple zones;
  receiving a message from the real-time location system, wherein the message is transmitted to the materials-handling vehicle in response to a determination by the real-time location system that the materials-handling vehicle has entered the particular zone and wherein the message indicates at least one beacon with which the materials-handling vehicle should communicate;
  in response to receipt of the message, communicating with one or more of said at least one beacon;
  determining, in response to communicating with one or more of said at least one beacon;
  an applicable rule of the road; and
  performing at least one of (i) modifying an operating characteristic of the materials-handling vehicle based on the applicable rule of the road and (ii) operating the materials-handling vehicle based on the applicable rule of the road.

11. A method according to claim 10, wherein:
the particular zone comprises an aisle;
the applicable rule of the road comprises a speed limit for a portion of the aisle; and
modifying an operating characteristic of the materials-handling vehicle comprises reducing a maximum speed for the materials-handling vehicle.

12. A method according to claim 10, wherein:
the particular zone comprises an aisle;
the applicable rule of the road comprises a speed limit for a portion of the aisle; and
operating the materials-handling vehicle comprises reducing a speed of the materials-handling vehicle.

13. A method according to claim 10, wherein performing at least one of (i) modifying an operating characteristic of the vehicle system and (ii) operating the vehicle system comprises modifying the operating characteristic of the vehicle system and operating the vehicle system.

14. A method according to claim 10, wherein:
the particular zone comprises an aisle;
the applicable rule of the road comprises a speed limit for a portion of the aisle;
modifying an operating characteristic of the materials-handling vehicle comprises reducing a maximum speed for the materials-handling vehicle; and
operating the materials-handling vehicle comprises reducing a speed of the materials-handling vehicle.

15. A system for enhancing compliance with rules of the road for materials-handling vehicles, the system comprising:
  an environment comprising multiple zones;
  a real-time location system configured to track locations of materials-handling vehicles within the environment comprising, wherein the multiple zones are established by the real-time location system, and wherein each of said zones is a portion of the environment;
  one or more beacons permanently located at fixed positions in the environment, wherein each beacon is associated with one or more of said zones;
  a materials-handling vehicle;
  a processor in the materials-handling vehicle and operably coupled to a vehicle system; and
  one or more receivers in or on the materials-handling vehicle and communicatively coupled with the processor, configured to receive signals from the real-time location system and from the one or more beacons;
  wherein the real-time location system is configured to transmit a signal to the receiver in response to the materials-handling vehicle entering a particular zone, wherein the signal identifies one or more chosen beacon from among said one or more beacons with which the materials-handling vehicle should communicate while in the particular zone;
  wherein a combination of the receiver and processor is further configured to communicate with said at least one of the one or more chosen beacons associated with the particular zone in response to receiving the signal from the real-time location system;
  wherein the combination of the receiver and processor is further configured to determine, in response to communicating with said at least one of the one or more chosen beacon, an applicable rule of the road; and
  wherein the combination of the receiver and processor is further configured to perform at least one of (i) modifying an operating characteristic of the vehicle system and (ii) operating the vehicle system based on the applicable rule of the road.

16. A system according to claim 15, wherein the particular zone designates an aisle, and the applicable rule of the road comprises a vehicle speed limit associated with a portion of the aisle.

17. A system according to claim 16, wherein the vehicle speed limit is associated with an exit end portion of the aisle.

18. A system according to claim 16, wherein one or more of said at least one of the one or more chosen beacons associated with the particular zone is located in the aisle.

19. A system according to claim 16, wherein one or more of said at least one of the one or more chosen beacons associated with the particular zone is located outside the aisle.

20. A system according to claim 15, wherein the applicable rule of the road is associated with the particular zone, and the applicable rule of the road is specific to a type of materials-handling vehicle.

21. A system according to claim 15, wherein performing at least one of (i) modifying an operating characteristic of the vehicle system and (ii) operating the vehicle system comprises modifying the operating characteristic of the vehicle system and operating the vehicle system.

22. A system according to claim 15, wherein the real-time location system is a wide-area system operable over most of the environment.

23. A system according to claim 22, wherein the real-time location system is operable over substantially all of the environment.

24. A system according to claim 15, wherein the real-time location system is further configured to instruct the materials-handling vehicle which beacon or beacons the materials-handling vehicle should ignore.

25. A materials-handling vehicle according to claim 1, wherein the real-time location system is a wide-area system operable over most of the environment.

26. A materials-handling vehicle according to claim 25, wherein the real-time location system is operable over substantially all of the environment.

27. A materials-handling vehicle according to claim 1, wherein the real-time location system is further configured to instruct the materials-handling vehicle which beacon or beacons the materials-handling vehicle should ignore.

28. A method according to claim 10, wherein the real-time location system is a wide-area system operable over most of the environment.

29. A method according to claim 28, wherein the real-time location system is operable over substantially all of the environment.

30. A method according to claim 10, wherein one or more messages further indicate at least one beacon that the materials-handling vehicle should ignore, the method further comprising:
   in response to receipt of the one or more messages, ignoring transmissions from one or more of the at least one beacon that the materials-handling vehicle should ignore.

31. A materials-handling vehicle according to claim 1, wherein the materials-handling vehicle communicates with the beacons with less latency than the materials-handling vehicle communicates with the real-time location system, such that the materials-handling vehicle can enforce the applicable rule of the road in time to be beneficial.

32. A method according to claim 10, wherein the materials-handling vehicle communicates with the beacons with less latency than the materials-handling vehicle communicates with the real-time location system, such that the materials-handling vehicle can enforce the applicable rule of the road in time to be beneficial.

33. A system according to claim 15, wherein the materials-handling vehicle communicates with the beacons with less latency than the materials-handling vehicle communicates with the real-time location system, such that the materials-handling vehicle can enforce the applicable rule of the road in time to be beneficial.

* * * * *

UNITED STATES PATENT AND TRADEMARK OFFICE
CERTIFICATE OF CORRECTION

Page 1 of 1

PATENT NO. : 12,394,312 B2
APPLICATION NO. : 17/464467
DATED : August 19, 2025
INVENTOR(S) : Draayer et al.

It is certified that error appears in the above-identified patent and that said Letters Patent is hereby corrected as shown below:

In the Claims

In Column 14, Line 7 (Claim 1), delete "the vehicle" and insert --the materials-handling vehicle-- therefor.

In Column 14, Line 18 (Claim 1), delete "beacon" and insert --beacons-- therefor.

In Column 16, Lines 6-7 (Claim 15), delete "beacon" and insert --beacons-- therefor.

In Column 16, Line 19 (Claim 15), delete "beacon," and insert --beacons,-- therefor.

Signed and Sealed this
Fourth Day of November, 2025

John A. Squires
*Director of the United States Patent and Trademark Office*